(12) United States Patent
Khabashesku et al.

(10) Patent No.: US 8,062,748 B2
(45) Date of Patent: Nov. 22, 2011

(54) METHODS FOR PREPARING CARBON NANOTUBE/POLYMER COMPOSITES USING FREE RADICAL PRECURSORS

(75) Inventors: Valery N. Khabashesku, Houston, TX (US); Enrique V. Barrera, Houston, TX (US); Daneesh McIntosh, Morgantown, WV (US); Laura Peña-Paras, Houston, TX (US)

(73) Assignee: William Marsh Rice University, Houston, TX (US)

( * ) Notice: Subject to any disclaimer, the term of this patent is extended or adjusted under 35 U.S.C. 154(b) by 114 days.

(21) Appl. No.: 12/507,470

(22) Filed: Jul. 22, 2009

(65) Prior Publication Data

US 2010/0113696 A1 May 6, 2010

Related U.S. Application Data

(62) Division of application No. 11/411,730, filed on Apr. 26, 2006, now abandoned.

(60) Provisional application No. 60/675,383, filed on Apr. 27, 2005.

(51) Int. Cl.
*B32B 9/00* (2006.01)
(52) U.S. Cl. ..................................... 428/408; 423/447.1
(58) Field of Classification Search .................. 428/408; 423/447.1; 977/742
See application file for complete search history.

(56) References Cited

U.S. PATENT DOCUMENTS

| | | | |
|---|---|---|---|
| 5,374,415 A | 12/1994 | Alig et al. | |
| 6,299,812 B1 | 10/2001 | Newman et al. | |
| 7,001,556 B1 * | 2/2006 | Shambaugh | 264/210.6 |
| 7,432,327 B2 | 10/2008 | Glasgow et al. | |
| 2004/0223900 A1 | 11/2004 | Khabashesku et al. | |

FOREIGN PATENT DOCUMENTS

DE 10038125 3/2002

OTHER PUBLICATIONS

International Search Report and Written Opinion for PCT/US2006/015919 mailed Aug. 4, 2006.
Barrera, et al., "Key methods for developing single wall nanotube composites", J. Mater., 52:2000, pp. 38-42.
Kelly, et al., "Insight into the mechanism of sidewall functionalization of single-walled nanotubes: an STM study", Chem. Phys. Lett., 313:1999, pp. 445-450.
Gojny, et al., "Surface modified multi-walled carbon nanotubes in CNT/epoxy-composites", Chem. Phys. Lett., 370:2003, pp. 820-824.
Shenderova et al, "Carbon Nanostructures", Critical Reviews in Solid State and Materials Sciences, 27(3/4):227.356 (2002).

(Continued)

*Primary Examiner* — David Sample
*Assistant Examiner* — Daniel H Miller
(74) *Attorney, Agent, or Firm* — Winstead PC (57) ABSTRACT

In some embodiments, the present invention is directed to methods of fully integrating CNTs and the surrounding polymer matrix in CNT/polymer composites. In some such embodiments, such integration comprises interfacial covalent bonding between the CNTs and the polymer matrix. In some such embodiments, such interfacial covalent bonding is provided by a free radical reaction initiated during processing. In some such embodiments, such free radical initiation can be provided by benzoyl peroxide. In some or other embodiments, the present invention is directed to CNT/polymer composite systems, wherein the CNTs within such systems are covalently integrated with the polymer. In some or other embodiments, the present invention is directed to articles of manufacture made from such CNT/polymer composite systems.

20 Claims, 10 Drawing Sheets

SPONTANEOUSLY ORDERED REGIONS WITH ISOTACTIC POLYPROPYLENE

OTHER PUBLICATIONS

Treacy et al, "Exceptionally high Young's Modulus Observed for Individual Carbon nanotubes". Nature (1996) 381;678.
Lourie et al. "Buckling and Collapse of Embedded Carbon Nanotubes". Phys. Rev. Lett. (1998); 81;1638.
Dyke et al., "Covalent Functionalization of Single-Walled Carbon Nanotubes for Materials Application". J. Phys. Chem. A. 2004; vol. 108 (51), 11151-11159.
Yakobson et al, "Nanomechanics of Carbon Tubes: Instabilities beyond Linear Response". Physics Review Letters (1996); 76; 2511.
Thostenson et al,. "Advances in the Science and Technology of Carbon Nanotubes and their Composites: A Review". Composite Science and Technology 61 (2001); 1899-1912.
Ijima et al, "Single-Shell Carbon Nanotubes of 1-nm Diameter." Nature (1993) 363; 603.
Bethune el. al "Cobalt-Catalyzed Growth of Carbon Nanotubes," Science (1993) 363;605.
Journet. et. al., "Large•Scale Production of Single-Walled Carbon Nanotubes by the Electric-Arc Technique." Nature (1997) 388; 756.
Thess et al.. "Crystalline Ropes of Metallic Carbon Nanotubes." Science (1996) 273; 483.
Rinzler et al.. "Large-Scale Purification of Single-Wall Carbon Nanotubcs: Process, Product and Characterization." Applied Physics A (1998) 67; 29.
Bronikowski et al., "Gas-Phase Production of Carbon Single-Walled Nanotubes from Carbon Monoxide via the HiPco Process: A Parametric Study" Journal of Vacuum Science Technology (2001) 19; 1800.
Chiang et al., "Purification and Characterization of Single-Wall Carbon Nanotubes (SWNTs) Obtained from the Gas-Phase Decomposition of CO (HiPco Process)" Journal of Physical Chemistry B (2001) 105; 8297-8301.
Kumar et al., "Fibers from Polypropylene/Nano Carbon Fiber Composites". Polymer 43 (2002); 1701-1703.
Lozano et al., "Nanofiber-Reinforced Thermoplastic Composites. I. Thermoanalytical and Mechanical Analysis" Journal of Applied Polymer Science, (2001) 79; 125.
Tibbetts, G.G. "Vapor-Grown Carbon Fibers: Status and prospects". Carbon (1989) 27;745.
Moore et al., "Enhancing the Strength of Polypropylene Fibers with Carbon Nanotubes". Journal of Applied Polymer Science, 93 (2004): 2926-2933.
Kearns et al., "Polypropylene Fibers Reinforced with Carbon Nanotubes." J. Appl. Polym. Sci. (2002) 86: 2079-2084.
Hammel et al., "Carbon nanofibers for Composite Applications". Carbon 42 (2004); 1153-1158.
Min et al., "Oxidative Stabilization of Pan/SWNT Composite Fiber." Carbon 43 (2005) 599-604.
Kumar et. al., "Synthesis. Structure and Properties of PBO/SWNT Composites" Macromolecules(2002); 35; 9039-9043.
Haggenmueller et al., "Production and Characterization of Polymer Nanocomposites with Highly Aligned Single-Walled Carbon Nanotubes", Journal of Nanoscicnce and Nanotechnology 3 (2003); p. 105.
Zhang et al., "Gel spinning of PVA/SWNT Composite Fiber". Polymer 45 (2004): 8801-8807.
Chat et al., "Gel Spinning of Poly(vinyl Alcohol) from Dimethyl Sulfoxide/ Water Mixture." Journal of Polymer Science, Part B; Polymer Physics (1994) 32; 297.
Vigolo et al., "Improved Structure and Properties of Single-walled Carbon Nanotube Spun Fiber". Applied Physics Letters (2002); 81(7); 1210-1212.
Yang et al., "Direct Growth of Macroscopic Fibers Composed of lager diameter SWNTs by CVD", Chemical Physics Letters (2003) 370; 274-279.
Dalton et al., "Super-tough Carbon-Nanotube Fibres" (2003) Nature; 423;703.
Kroto et al., "C60: Buckminsterfullerene". Nature 1985; 318, 162-163.
Iijima, "Helical microtubules of graphitic carbon" Nature 1991; 354, 56-58.
Walters et. al, "Elastic Strain of Freely Suspended Single-Walled Carbon Nanotube Ropes". Applied Physics Letters, (1999) 74; 3803.
Yu et. al., "Tensile Loading of Ropes of Single-Wall Carbon Nanotubes and Their Mechanical Properties" Physical Review Letters, (2000) 84; 5552.
Shofner "Nanotube Reinforced Composites." Diss. Rice University, 2003. Thermoplastic Polymer Matrix.
Lozano et al., "A Study on Nanofiber-Reinforced Thermoplastic Composites n. Investigation of the Mixing Rheology and Conduction Properties". Journal of Applied Polymer Science (2001);80 1162.
Roberts et al., Chemical Coupling agents for filled and grafted Polypropylene Composites, 3,(2003); 35-80.
Rodriguez-Macias, "Fully Integrated Single-Walled Thermoplastic Composites" Diss. Rice University, 2003. Carbon Nanotube.
Xia Z et al., "Direct Observations of Toughening Mechanisms in Carbon Nanotube Ceramic Matrix Composites", Acta Materialia 52 (2004); 931-944.
Ajayan, "Single-walled carbon nanotube-polymer composites: strength and weakness", Adv. Mater., 2000, 12, 750.
Ebbesen, "Carbon Nanotubes", Ann. Rev. Mater, 1994, 24, 235.
Vander Wal, "Flame synthesis of Fe catalyzed single-walled carbon nanotubes and Ni catalyzed nanofibers: growth mechanisms and consequences", Chem. Phys. Lett., 2001, 349, 178.
Hafner, "Catalytic growth of single-wall carbon nanotubes from metal particles", Chem. Phys. Lett., 1998, 296, 195.
Cheng, "Bulk morphology and diameter distribution of single-walled carbon nanotubes synthesized by catalytic decomposition of hydrocarbons", Chem. Phys. Lett., 1998, 289, 602.
Nikolaev, "Gas-phase catalytic growth of single-walled carbon nanotubes from carbon monoxide", Chem. Phys. Lett., 1999, 313, 91.
Chiang, "Purification and characterization of single-wall carbon nanotubes", J. Phys. Chem. B., 2001, 105, 1157.

* cited by examiner

METHODS FOR PREPARING CARBON NANOTUBE/POLYMER COMPOSITES USING FREE RADICAL PRECURSORS

CROSS-REFERENCE TO RELATED APPLICATIONS

This application is a divisional application of U.S. patent application Ser. No. 11/411,730, filed Apr. 26, 2006, which claims priority to U.S. provisional patent application 60/675,383, filed Apr. 27, 2005, each of which are incorporated by reference herein in their entirety.

STATEMENT REGARDING FEDERALLY SPONSORED RESEARCH

This invention was made with government support under Grant No. NCC-1-02036, awarded by the National Aeronautics and Space Administration. The Government has certain rights in the invention.

FIELD OF THE INVENTION

The present invention relates generally to carbon nanotube/polymer composites, and specifically to fully integrating carbon nanotubes into thermoplastic matrices via interfacial covalent bonding.

BACKGROUND

Carbon nanotubes (CNTs), comprising multiple concentric shells and termed multi-walled carbon nanotubes (MWNTs), were discovered by Iijima in 1991 (Iijima, *Nature*, 1991, 354, 56). Subsequent to this discovery, single-walled carbon nanotubes (SWNTs), comprising a single graphene sheet rolled up on itself, were synthesized in an arc-discharge process using carbon electrodes doped with transition metals (Iijima et al., *Nature*, 1993, 363, 603; and Bethune et al., *Nature*, 1993, 363, 605).

SWNTs have highly anisotropic mechanical properties, however, by processing fully integrated single-walled carbon nanotube composites into nanotube continuous fibers (NCFs), their highly directional properties can be more effectively exploited (Barrera, *J. of Mater.* 2000, 52, 38). Manipulating these nanoscopic materials into an aligned configuration can be accomplished more easily by processing the composites into fibers, allowing for better macroscopic handling of these nano-sized materials. In some cases, the SWNTs are used as nanoscale reinforcements in a polymer matrix in order to take advantage of their high elastic modulus (approaching 1 TPa) and tensile strengths (in the range 20-200 GPa for individual nanotubes) (Krishnan et al., *Phys. Rev. B.* 1998, 58, 14013). SWNTs are, however, more likely to be incorporated in the matrix as ropes or bundles of nanotubes, as a result of van der Waals forces that hold many entangled ropes together. These ropes or bundles are reported as having tensile strengths in the range of 15-52 GPa (Shenderova et al., *Critical Revs Solid State Mater. Sci.* 2002, 27, 227; Treacy et al., *Nature* 1996, 381, 678; Lourie et al., *Phys. Rev. Lett.* 1998, 81, 1638).

Polypropylene is a thermoplastic material that has excellent chemical resistance, and good mechanical properties with tensile strengths in the range of 30-38 MPa and tensile modulii ranging from 1.1-1.6 GPa for the bulk material (Hertzberg, R. W. *Deformation and Fracture Mechanics of Engineering Materials.* $4^{th}$ Ed. Publ. John Wiley and Sons, 1996). A number of researchers, such as Kearns and Shambaugh (Kearns et al., *J. Appl. Polym. Sci.* 2002, 86, 2079), and Moore et al. (Moore et al., *J. Appl. Polym. Sci.* 2004, 93, 2926), have incorporated SWNTs into polypropylene matrices. Kearns and Shambaugh reported a 40% increase in fiber tensile strength for composites containing a 1 wt. % loading of SWNTs, while Moore et al. did not find any significant improvements in mechanical properties. These studies seem to indicate that efficient load transfer between the polymer matrix and the stronger, reinforcing SWNTs was not necessarily achieved.

In processing carbon nanotubes and a thermoplastic matrix into a fully integrated composite system, the chemically inert nature of each of these materials must be overcome in order to facilitate good interfacial adhesion, which in turn allows for better load transfer when a tensile load is applied to the system. Ineffective interfacial bonding, and sliding of individual nanotubes within nanotube ropes, will hamper load transfer from the matrix to the fiber, thereby limiting the amount of mechanical reinforcement that can be achieved in the composite (Ajayan et al., *Adv. Mater.* 2000, 12, 750).

As a result of the foregoing, a method for enhancing interfacial adhesion between the carbon nanotubes and the surrounding polymer matrix in such above-described composites, would be quite beneficial.

SUMMARY

In some embodiments, the present invention remedies the limitations of the aforementioned carbon nanotube (CNT)/polymer composites of the prior art by improving the interfacial adhesion between the CNTs and the polymer. Generally, such improvement is accomplished by fully integrating the CNTs into the polymer matrix. Accordingly, in some embodiments, the present invention is directed to methods of fully integrating CNTs and the surrounding polymer matrix in CNT/polymer composites. In some such embodiments, such integration comprises interfacial covalent bonding between the CNTs and the polymer matrix. In some such embodiments, such interfacial covalent bonding is provided by a free radical reaction initiated during processing. In other embodiments, the present invention is directed to fully integrated CNT/polymer composite systems made by such methods, and to articles of manufacture made with such CNT/polymer composite systems.

In some embodiments, the present invention is directed to a method comprising the steps of: (a) dispersing CNTs, thermoplastic polymer, and a free radical precursor species in a solvent; (b) removing the solvent to form polymer-overcoated CNTs comprising free radical precursor; and (c) compounding the polymer-overcoated CNTs comprising free radical precursor to form a fully-integrated CNT/polymer composite comprising interfacial covalent bonding between the CNTs and the polymer, the polymer serving as a matrix. In some such embodiments, there is an additional step of processing the fully-integrated CNT/polymer composite in an extruder to form a nanotube continuous fiber (NCF) product. In some cases, the nanotubes of which the NCF is comprised are substantially aligned in the NCF product by virtue of shear forces associated with extrusion.

In some embodiments, the present invention is directed to a CNT/polymer composite system comprising CNTs dispersed in a thermoplastic matrix, wherein the CNTs serve as reinforcement elements, and wherein the CNTs are covalently bonded to the thermoplastic matrix. In some or other embodiments, the present invention is directed to articles of manufacture made with the aforementioned CNT/polymer composite system.

Particularly, in some embodiments, single-walled carbon nanotubes (SWNTs) can be more effectively exploited as reinforcement elements in a thermoplastic matrix via the formation of a fully integrated composite system in which the SWNTs are covalently linked to the surrounding polymer matrix, as is facilitated by the incorporation of benzoyl peroxide in the processing. SWNTs are ideal for incorporation into composite systems as they are nanoscopic and have excellent mechanical properties. Additionally, in some embodiments, a more effective load transfer can be accomplished by the formation of a more substantial interface between the thermoplastic matrix (e.g., polypropylene) and the SWNTs, as well as the alignment of the incorporated SWNTs in the axial direction, via, e.g., fiber spinning.

Figure 1:
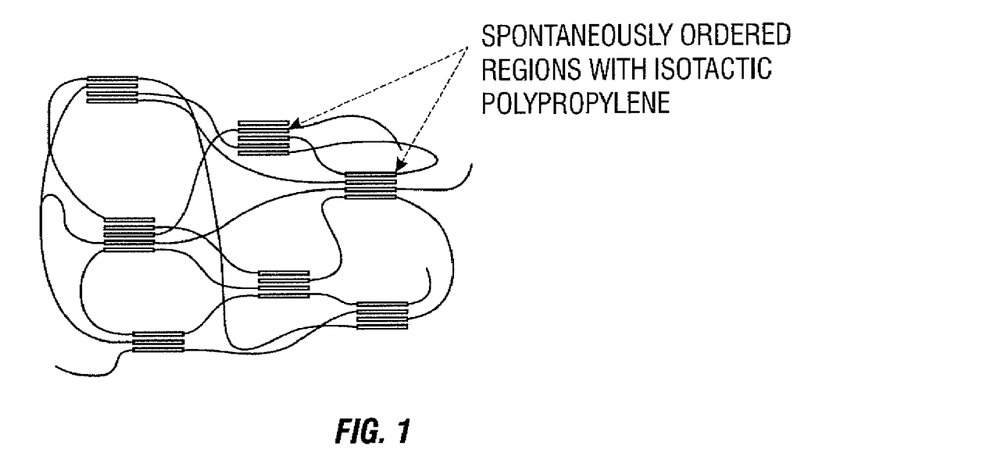
FIG. 1 depicts crystalline regions of isotactic polypropylene showing alignment.
Figure 2:
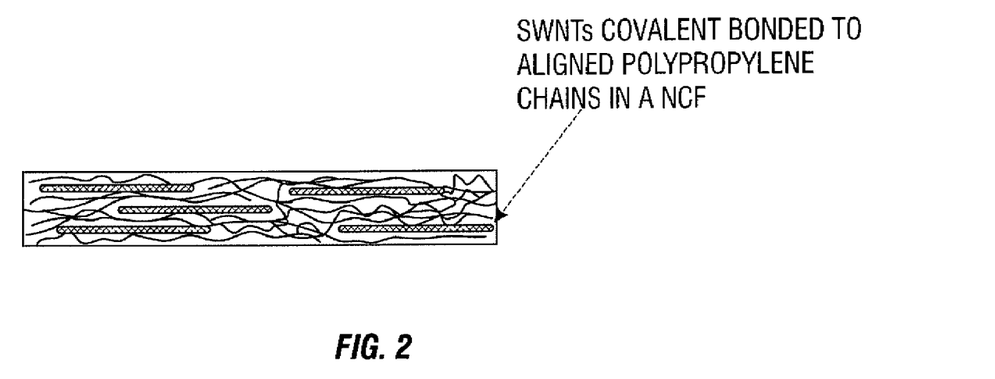
FIG. 2 depicts a nanotube continuous fiber (NCF) showing nanotubes covalently bonded to polypropylene chains and aligned in the axial direction.

In some such above-described embodiments, the introduction of benzoyl peroxide in the processing stages of the composites provides an initiator for a reaction in which radical sites are generated along the polypropylene chain, thereby creating an opportunity for the otherwise inert polymer to interact with the similarly inert SWNT, resulting in a covalent bond being formed between the polymer chains and the surface of the SWNTs. Further processing via fiber spinning results in a system in which the SWNTs are then aligned in the axial direction. The high crystallinity of isotactic polypropylene, depicted in FIG. 1, is exploited as the SWNTs, which are covalently linked to the molecular chains, are forced to order themselves along with the chains in the small diameter NCFs, as shown in FIG. 2.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In some embodiments, the present invention is directed to methods of fully integrating carbon nanotubes (CNTs) and the surrounding polymer matrix in CNT/polymer composites. In some such embodiments, such integration comprises interfacial covalent bonding between the CNTs and the polymer matrix. In some such embodiments, such interfacial covalent bonding is provided by a free radical reaction initiated during processing. In some such embodiments, such free radical initiation can be provided by benzoyl peroxide. In some or other embodiments, the present invention is directed to CNT/polymer composite systems, wherein the CNTs within such systems are covalently integrated with the polymer. In some or other embodiments, the present invention is directed to articles of manufacture made from such CNT/polymer composite systems.

"Fully integrated," as defined herein, refers to covalent bonding between CNTs and a polymer matrix in which they are incorporated with a high level of dispersion.

"Interfacial," as used herein, refers to the interface between the CNTs and the polymer matrix, and to how covalent bonds are established between the CNTs and the polymer matrix in a fully integrated CNT/polymer composite system.

In some embodiments, the present invention is directed to a CNT/polymer composite system comprising CNTs dispersed in a thermoplastic matrix, wherein the CNTs serve as reinforcement elements, and wherein the CNTs are covalently bonded to the thermoplastic matrix. The present invention is also directed to articles of manufacture made from the CNT/polymer composite system of the present invention.

In some embodiments, the present invention is directed to a method for making the above-mentioned CNT/polymer composite, the method comprising the steps of: (a) dispersing CNTs, thermoplastic polymer, and a free radical precursor species in a solvent; (b) removing the solvent to form polymer-overcoated CNTs comprising free radical precursor; and (c) compounding the polymer-overcoated CNTs comprising free radical precursor to form a fully-integrated CNT/polymer composite comprising interfacial covalent bonding between the CNTs and the polymer, the polymer serving as a matrix. In some such embodiments, the method comprises a further step of processing the fully-integrated CNT/polymer composite in an extruder to form a nanotube continuous fiber (NCF) product. In some such embodiments, the nanotubes are substantially aligned in the NCF product by virtue of shear forces associated with extrusion. Generally, steps (a) and (b) are collectively an "incipient wetting" process.

Solvents suitable for use in the above-described method embodiments include, but are not limited to, chloroform ($CHCl_3$), tetrahydrofuran (THF), toluene, o-dichlorobenzene, and the like. In some of the above-described method embodiments, the step of dispersing involves the use of a surfactant. Exemplary surfactants include, but are not limited to, cetyltrimethylammonium bromide (CTAB), sodium dodecylsulfate (SDS), and the like. Additionally, in some embodiments, ultrasonic assistance (i.e., sonication) may be employed in the dispersing.

Generally, the free radical precursor species is any species or combination of species which can be converted to a free radical species capable of further reacting so as to initiate (i.e., a free radical initiator) the formation of free radicals on the CNTs and/or thermoplastic polymer. Typically, such species become volatile or decompose into volatile products at processing temperatures. Typically, the free radical precursor species is a peroxide. An exemplary such peroxide species is benzoyl peroxide. Other suitable free radical precursor species include, but are not limited to, 2,2'-azo-bis(isobutyronitrile) (AIBN).

Thermoplastic polymer, as defined and used herein, can generally be any such polymer capable of being processed in accordance with embodiments of the present invention. Such polymer includes, but is not limited to, polypropylene, polyethylene, polyacrylonitrile, polystyrene, polyamides, polycarbonate, and the like.

Carbon nanotubes (CNTs), in accordance with embodiments of the present invention, include, but are not limited to, single-walled carbon nanotubes (SWNTs), multi-walled carbon nanotubes (MWNTs), double-walled carbon nanotubes (DWNTs), buckytubes, fullerene tubes, tubular fullerenes, graphite fibrils, and combinations thereof. Such CNTs can be made by any known technique including, but not limited to the HiPco® process, (Bronikowski et al., *J. Vac. Sci. Technol. A.* 2001, 19, 1800), arc discharge (Ebbesen, *Annu. Rev. Mater. Sci.* 1994, 24, 235), laser oven (Thess et al., *Science* 1996, 273, 483), flame synthesis (Vander Wal et al., *Chem. Phys. Lett.* 2001, 349, 178), chemical vapor deposition (U.S. Pat. No. 5,374,415), wherein a supported (Hafner et al., *Chem. Phys. Lett.* 1998, 296, 195) or an unsupported (Cheng et al., *Chem. Phys. Lett.* 1998, 289, 602; and Nikolaev et al., *Chem. Phys. Lett.* 1999, 313, 91) metal catalyst may also be used, and combinations thereof. Depending on the embodiment, the CNTs can be subjected to one or more processing steps prior to subjecting them to any of the processes of the present invention. In some embodiments, the CNTs have been purified. Exemplary purification techniques include, but are not limited to, those by Chiang et al. (Chiang et al., *J. Phys. Chem. B* 2001, 105, 1157; Chiang et al., *J. Phys. Chem. B* 2001, 105, 8297). The terms "CNT" and "nanotube" are used synonymously herein. Furthermore, while much of the discussion herein involves SWNTs, it should be understood that many of the methods and/or compositions of the present invention utilizing and/or comprising SWNTs can also utilize and/or comprise MWNTs or any of the other types of CNTs discussed above.

In some embodiments, mixtures of various types of CNTs are employed, e.g., combinations of SWNTs and MWNTs. In some such embodiments, such combinations of CNTs provide enhanced, synergistically-derived properties. Depending on the embodiment, such CNTs can be initially supplied in the form of a fluff (felt), powder, pearls, and/or bucky paper.

What follows is a study involving the formation of an interfacial region via covalent bonding of SWNTs to a polypropylene matrix, in accordance with some embodiments of the present invention. The resulting improved mechanical properties of the fully integrated SWNT/polymer composite system spun into fibers are shown in comparison to those of composites of polypropylene and purified single walled nanotubes (P-SWNTs) or neat polypropylene fiber.

EXPERIMENTAL EXAMPLES

SWNTs (Carbon Nanotechnology Inc., Houston, Tex.; batch number D0310) were incorporated in varying weight percentages into 20 g batches of isotactic polypropylene from Aldrich Chemicals with $M_n$=67,000 and $M_w$=250,000 with a melt-index of 12 g/10 min (230° C./2.16 kg, ASTM D1238). In order to fabricate the composite materials from the two components, i.e., (1) purified SWNTs (P-SWNTs) or benzoyl peroxide initiated functionalization of P-SWNT (BP-f-SWNT) and (2) polypropylene, a multi-step processing procedure was used. The steps included dispersion of SWNTs into solvent to disrupt large agglomerates, incipient wetting, high shear mixing, followed by pelletization, and fiber spinning. The final product resulting from these processing and fabrication steps were NCFs with diameters of approximately 130 μm.

In the initial stages of processing each individual batch, the SWNTs were combined with chloroform and sonicated for several minutes. The SWNT suspension, in the case of the P-SWNT samples, was combined with the polypropylene to overcoat the polymer pellets and create an initial dispersion between the polymer and the SWNTs (Barrera, *J. of Mater.* 2000, 52, 38; M. Shofner, "Nanotube Reinforced Thermoplastic Polymer Matrix Composites," Ph.D. Dissertation, Rice University, 2003). The polypropylene pellet/SWNT suspension mixture was then heated in an oil bath at temperatures between 70° C. and 80° C. and dried in a vacuum oven at 80° C. to remove the solvent. The overcoated, dried powder/pellet mixture had a gray color. The preparation of the BP-f-SWNTs samples varied slightly. In each of the batch samples prepared, 0.5 g of benzoyl peroxide was added to the SWNTs and polymer in solvent. The solution was then introduced into a rotary evaporator to remove the solvent. The overcoated powder/pellet mixture was then compounded by high shear mixing with a HAAKE Polylab System using a 30 cm³ mixing bowl. The P-SWNT batches were mixed at a temperature of 165° C. for 12 minutes at a speed of 75 rpm. The BP-f-SWNT batches were heated by ramping the temperature by 10° C. per 3 minutes to 165° C. to initiate and sustain the in situ reaction, which leads to the covalent bonding of the SWNTs to the polymer chains.

After high shear mixing, the material was processed into pellet form before introduction into a C. W. Brabender single-screw extruder to spin the fibers. The extruder used had four independently-heated zones though which the melting polymer flowed. The first zone, closest to the hopper, was heated to a temperature of 170° C., the second 187° C., the third 193° C. and the fourth at the nozzle where the material was forced through a single 0.79 mm dye was at a temperature of 216° C. The extruder screw was programmed to rotate at 4 rpm. The extruded material was immediately pulled onto a fiber take-up reel, which took up the fiber at a constant rate (0.422 g/min of fiber). The composite fiber diameters were measured using scanning electron microscopy (SEM) and found to be, on average, 130 μm. The following fibers with varying compositions were prepared: neat polypropylene, 2.5 wt. % P-SWNT/polypropylene, 5 wt. % P-SWNT/polypropylene, 7.5 wt. % P-SWNT/polypropylene, 10 wt. % P-SWNT/polypropylene and 2.5 wt. % BP-f-SWNT/polypropylene, 5 wt. % BP-f-SWNT/polypropylene, 7.5 wt. % BP-f-SWNT/polypropylene, 10 wt. % BP-f-SWNT/polypropylene.

Scanning electron microscopy (SEM) imaging, Raman spectroscopy, thermogravimetric analysis (TGA), and mechanical testing were used to evaluate the interaction between the SWNTs and polypropylene after the processing steps. The SEM studies were performed with a Phillips Electroscan ESEM XL30 instrument. To prevent sample surface charging all composite and neat polymer samples were coated with chrome prior to analysis. The TGA in air experiments were conducted using a TA Instruments SDT 2960 device. An Instron Model 5565 was used to perform tensile tests on the fibers, following the mounting specification indicated by ASTM standard C1557-03. A 50 N load cell was used to test the samples in uniaxial tension. The gauge lengths were uniformly 25 mm, the crosshead speed used was 254 mm/min.

Results and Discussion

Figure 3:
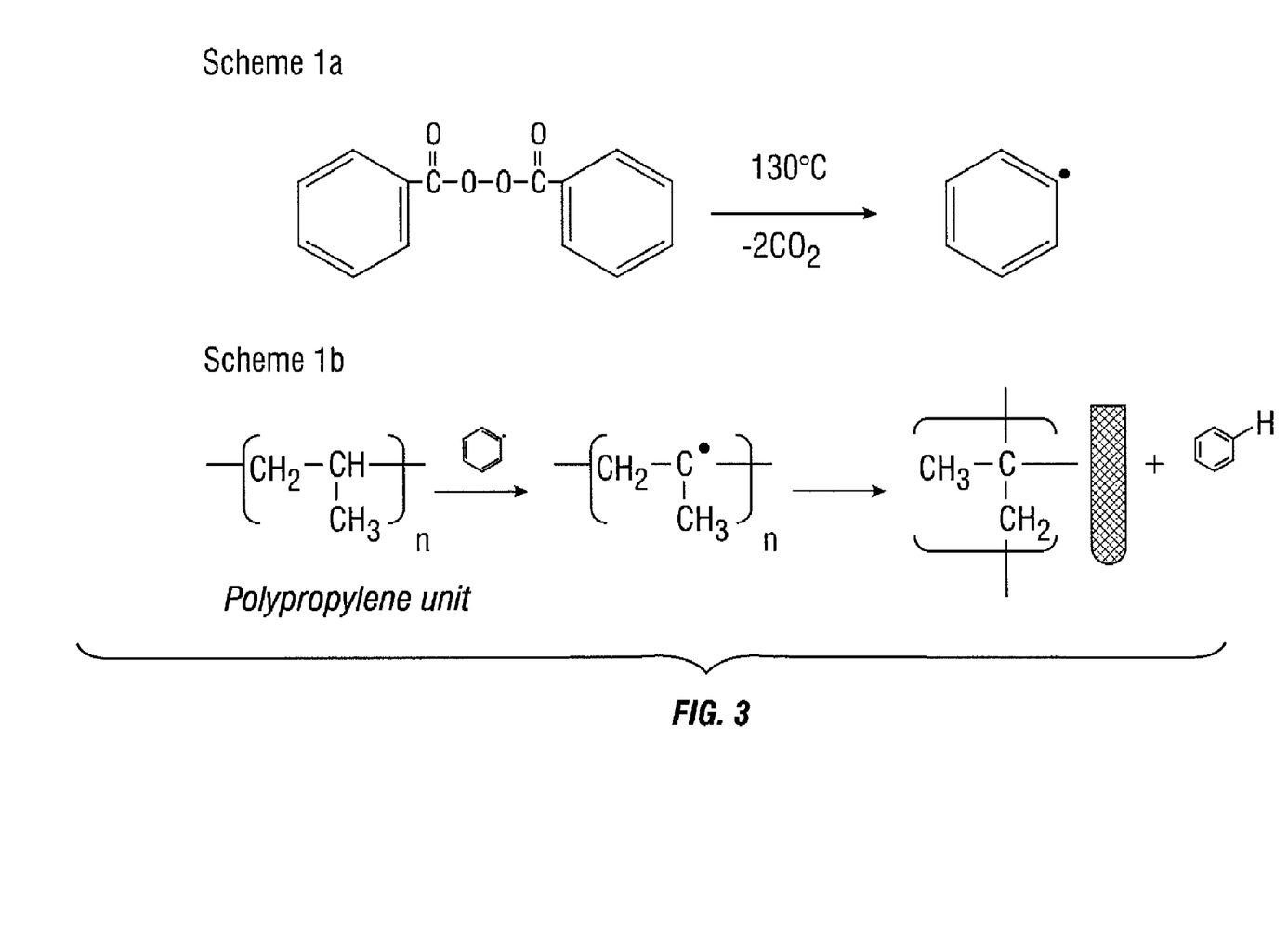
FIG. 3 (Scheme 1a) depicts benzoyl peroxide being decomposed to form phenyl radicals with the loss of carbon dioxide gas, and (Scheme 1b) the proposed reaction scheme for benzoyl peroxide initiated functionalization of SWNT (BP-f-SWNT), wherein the polypropylene polymer chains are covalently linked directly with the SWNT.

Benzoyl peroxide was incorporated into the SWNT/polypropylene batches in order to initiate a functionalization reaction in which the benzoyl peroxide facilitates the formation of a primary bond between the polymer chains and the SWNTs. This is accomplished through a free radical reaction which is initiated during the high temperature, high shear mixing process, whereby a phenyl radical is generated with the liberation of carbon dioxide. The phenyl radical in turn removes a proton from the polypropylene chain causing the formation of a radical site that in turn bonds directly to the SWNTs present. The benzene formed during processing is volatile and subsequently evaporates. FIG. 3, Scheme 1a illustrates the chemical structure of the benzoyl peroxide before the process is started and what happens when high temperature conditions are achieved (i.e., decomposition), while FIG. 3, Scheme 1b illustrates the possible reaction scheme which generates covalent bonding between the SWNTs and the polypropylene chains.

Raman analysis of the P-SWNTs and the corresponding weight percents of BP-f-SWNTs in a polymer matrix support covalent bonding of the polypropylene to the SWNTs as shown in Schemes 1a and 1b of FIG. 3. In Raman spectroscopy of SWNTs, the disorder mode (D band) is indicative of sidewall defects in the form of $sp^3$ carbon bonding, and the tangential mode (G band) is indicative of $sp^2$ carbon-carbon bond stretching mode. These modes are used to evaluate the interaction between the nanotubes and the polymer. The Raman spectra generated in FIG. 4 indicate that functionalization of the SWNTs has been accomplished.

In general, across the four weight percentages of samples containing BP-f-SWNTs, similar tends in the spectra were seen when compared to the corresponding weight percents of P-SWNT in polypropylene samples. The increase in the intensity of the D-peak, as observed in the BP-f-SWNTs samples, indicates that the symmetry along the nanotube length has been changed. The ratios of the G to D peaks also reflect that a change in the structure of the pristine nanotubes has occurred. This suggests that the reaction initiated during the high shear mixing stage of the processing was successful in functionalizing the nanotubes. The mechanical strength tests are used to confirm this. The G:D ratios shown in Table 1 reflect the significant decreases in the crystal symmetry of the hexagonally-arrayed graphene sheets of which the nanotube is made (Dresselhaus et al., Carbon, 1995, 33, 925-930). It is the intent of the functionalization process to essentially covalently bond and wrap the nanotube in the long chains of the polymer, thereby yielding lower G:D ratios for the BP-f-SWNT systems.

TABLE 1

G:D ratios for BP-f-SWNT and PSWNT in polypropylene composites.

| Weight Percent | Sample | G-Peak Intensity | D-Peak Intensity | G:D ratio |
|---|---|---|---|---|
| 2.5 wt. % | P-SWNT | 2804 | 534 | 5.25 |
|  | BP-f-SWNT | 3344 | 1044 | 3.2 |
| 5 wt. % | P-SWNT | 5006 | 777 | 6.44 |
|  | BP-f-SWNT | 3344 | 1002 | 3.3 |
| 7.5 wt. % | P-SWNT | 6721 | 1314 | 5.11 |
|  | BP-f-SWNT | 2745 | 950 | 2.88 |
| 10 wt. % | P-SWNT | 13447 | 1373 | 9.79 |
|  | BP-f-SWNT | 3975 | 1168 | 3.4 |

Figure 4:
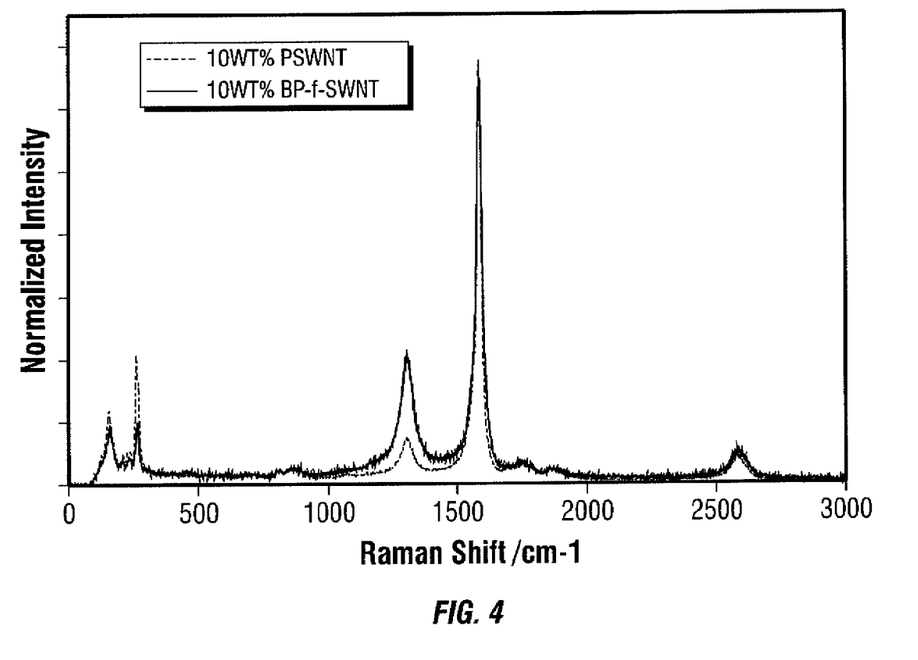
FIG. 4 depicts comparative spectra for the 10 wt. % BP-f-SWNT and 10 wt. % P-SWNT in polypropylene.

The comparative spectra of the 10 wt. % samples were evaluated for the BP-f-SWNT and P-SWNT cases and are shown in FIG. 4. These trends are also seen for the other weight percents. There is a general trend of increased values of the intensity of the D peaks in the 2.5 wt. %, 5 wt. %, 7.5 wt. % and 10 wt. % BP-f-SWNT samples, while there was a general decrease in the intensity of the G peaks compared to the corresponding weight percents of P-SWNT samples.

Figure 5:
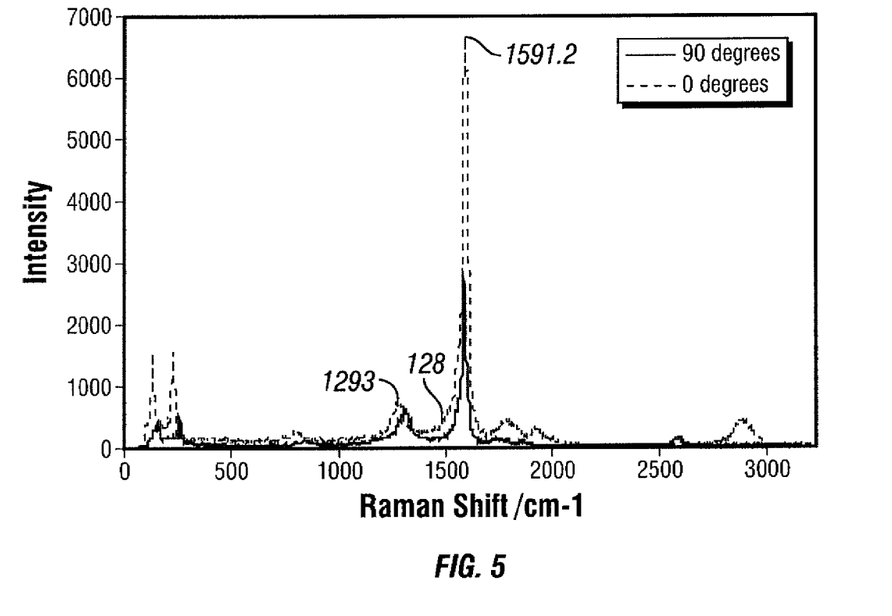
FIG. 5 depicts the differences in the intensities of the D and G peaks for a 10 wt. % sample of P-SWNT fiber.

The degree of alignment of the nanotubes in the polymer matrix significantly affects the mechanical strength of the final composite (Kelly et al., Chemical Physics Letters 1999, 313, 445-450). Raman spectra of the individual fibers with their fiber-axis oriented either parallel (0°) to or perpendicular (90°) to the incident laser polarization was acquired (Dresselhaus et al., Carbon 2003, 40, 204; Yang et al., Chem. Phys. Lett. 2003, 370, 274). Carbon nanotubes behave as antennas, with the absorption/emission of light being highly suppressed for light polarized perpendicular to the nanotube axis (Dresselhaus et al., Carbon 2003, 40, 204). Therefore, for aligned nanotubes, whether individual or roped, the largest Raman intensity will be observed for light polarized along the tube axis, and much lower signal intensity being observed for cross polarized light. The Raman spectra for an NCF sample containing 10 wt. % P-SWNT in a polypropylene matrix is shown in FIG. 5, with the spectra exhibiting this expected polarization effect. Table 2 tabulates the data obtained from the spectra in FIG. 5.

TABLE 2

G:D ratios for 0° and 90° oriented fibers of P-SWNT in polypropylene

| Sample | Fiber-axis Rotation | G-Peak Intensity | D-Peak Intensity | G:D Ratio |
|---|---|---|---|---|
| 10 wt. % P-SWNT (4r) fiber | 0° | 6664 | 742 | 8.98 |
|  | 90° | 2857 | 607 | 4.71 |
|  |  | G:G | D:D |  |
| Ratio of 0°:90° |  | 2.33 | 1.22 |  |

Figure 6:
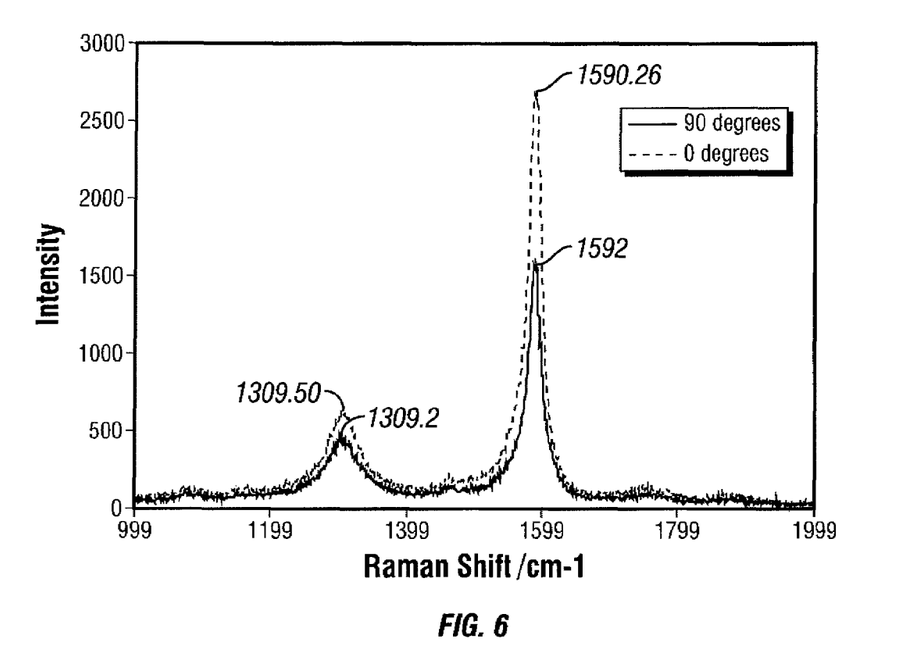
FIG. 6 depicts the variance in the intensities attained with degree of alignment for BP-f-SWNT fibers in polypropylene.

The shifts observed in FIG. 5 are a function of the low resonance of the nanotubes due to the perpendicular alignment of the tubes. The marked increases in the ratio of the G to D peaks correlate to the macroscopic alignment of the SWNTs and their ropes and bundles in the fibers spun. Alignment in the 0° direction correlates with the alignment in the axial direction as illustrated in FIG. 2. Similar fiber alignment spectra are observed for the benzoyl-peroxide functionalized nanotubes, the short-range scan are used to more closely evaluate the D and G peaks, as shown in FIG. 6. Table 3 tabulates the data obtained from the spectra shown in FIG. 6.

TABLE 3

G:D ratios for 0° and 90° oriented 4r-fibers of BP-f-SWNT in polypropylene.

| Sample | Fiber-axis Rotation | G-Peak Intensity | D-Peak Intensity | G:D Ratio |
|---|---|---|---|---|
| 10 wt. % BP-f-SWNT fiber | 0° | 2643 | 598 | 4.42 |
|  | 90° | 1497 | 429 | 3.49 |
|  |  | G:G | D:D |  |
| Ratio of 0°:90° |  | 1.76 | 1.39 |  |

Mechanical tests conducted on the NCFs showed a consistent improvement in the properties of those fibers into which benzoyl peroxide had been incorporated. There was an improvement of 48.4%, 39.7%, 64.2% and 61% in the tensile strength of the 2.5 wt. %, 5 wt. %, 7.5 wt. %, and 10 wt. % BP-f-SWNT-NCFs, respectively, over the corresponding weight percents of P-SWNT-NCFs. The improvements in the modulus were 42.1%, 61%, 76% and 61% of the BP-f-SWNT-NCFs over the corresponding weight percents of P-SWNT-NCFs. These results lend credence to the postulate that the benzoyl peroxide initiated functionalization of the SWNTs has, in fact, taken place and aids in securing the fiber-matrix interface via the mechanism proposed herein, thereby allowing for greater load transfer from the matrix to the nanotube. The result is that not only are the mechanical properties of the BP-f-SWNT-NCFs superior to those of the P-SWNT-NCFs, but compared to the neat polypropylene fiber there was an increase in the tensile strength of 82.9%, 89.8%, 72.3% and 173.1% for the respective weight percents, and an increase in the elastic modulus of 69.2%, 99.7%, 137.2% and 133.7%.

Figure 7:
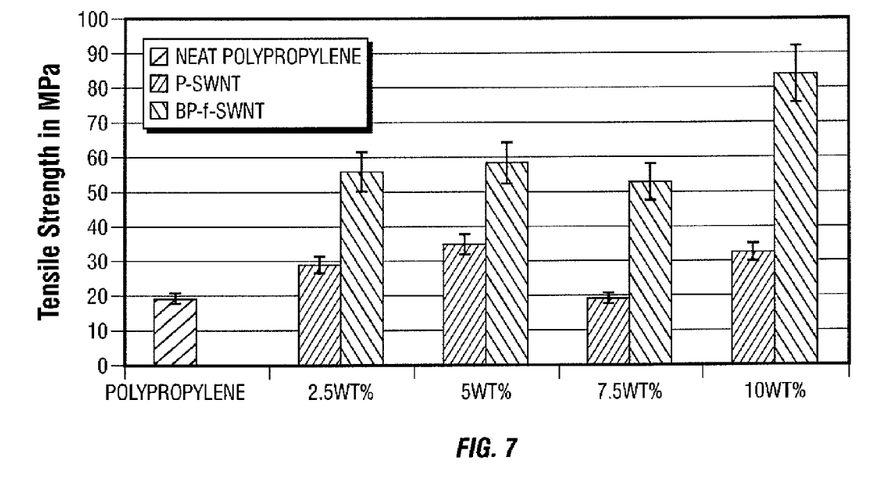
FIG. 7 is a comparison of tensile strengths for 130 µm fibers.
Figure 8:
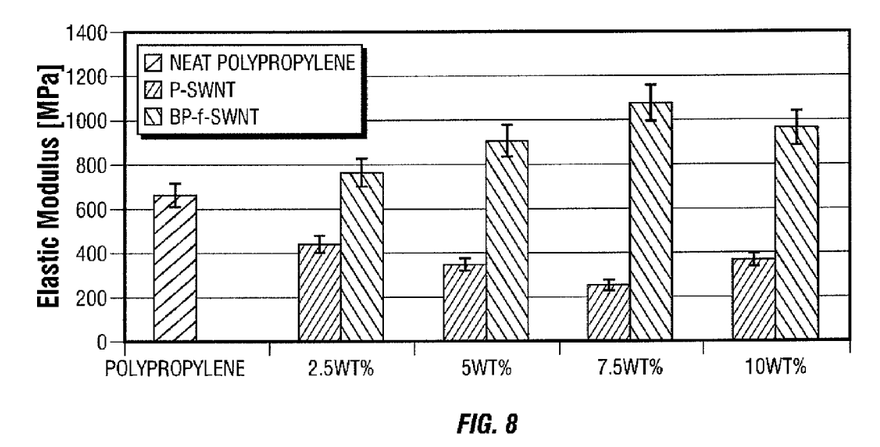
FIG. 8 is a comparison of elastic modulus for 130 µm fibers.
Figure 9:
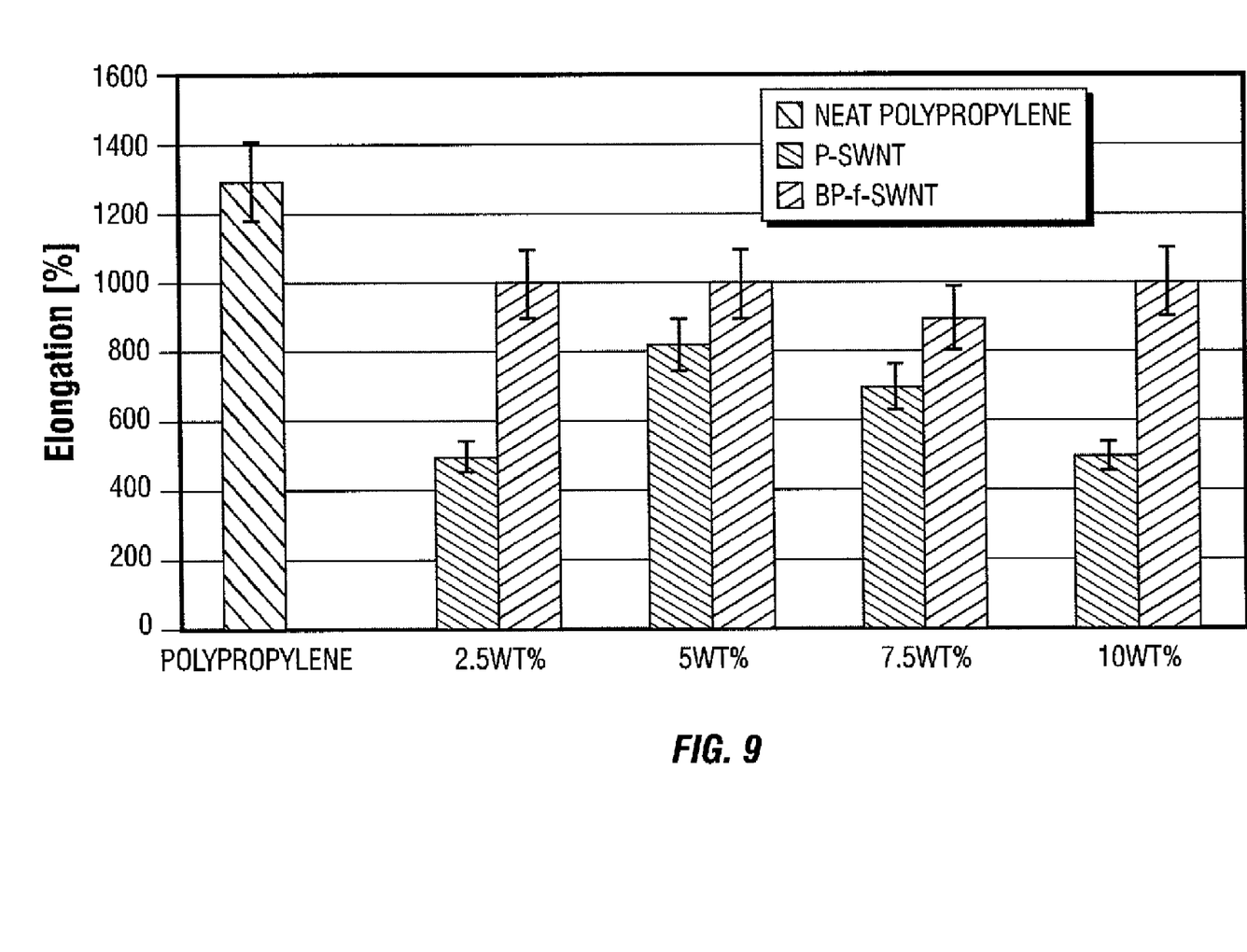
FIG. 9 is a comparison of % elongation for 130 µm fibers.

The comparative results of fiber tensile strengths, elastic modulus, and % elongation are shown in FIGS. 7-9, wherein FIG. 7 is a comparison of tensile strengths for 130 μm fibers, FIG. 8 is a comparison of elastic modulus for 130 μm fibers, and FIG. 9 is a comparison of % elongation for 130 μm fibers. This data is shown in Table 4.

Figure 10:
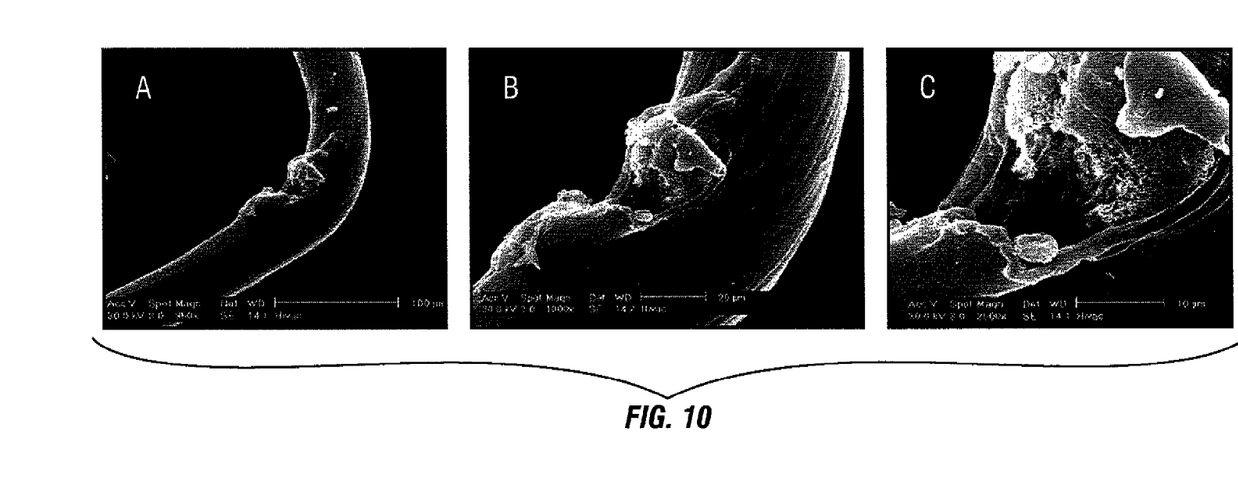
FIGS. 10(A)-10(C) depict failure initiation in a BP-f-SWNT fiber.

Fracture occurs in the fibers at regions of high-accumulated stress, as is the case when the polymer flows to a point where the diameter of the original fiber has decreased significantly under tensile loading. However, other regions within the composite where ropes of nanotubes have not been completely disrupted and dispersed can result in high stress regions that lead to fiber failure. These regions can thereby act as initiators for failure before maximum elongation of the polymer matrix is achieved. The initiation of a premature failure of a BP-f-SWNT-NCF is shown in FIGS. 10(A)-10(C).

In order to maximize the effectiveness of the schemes proposed (FIG. 3, Schemes 1a & 1b), even better dispersion of the nanotubes may still be necessary. This will minimize defective regions within the fibers allowing for the formation of an even better composite. If individualized nanotubes, or at very least smaller ropes of nanotubes, can be established before the incorporation of the benzoyl peroxide, then there will be more surface area for interaction with the free radicals, thereby promoting a better and more complete interfacial adhesion between the components of the composite.

Figure 11:
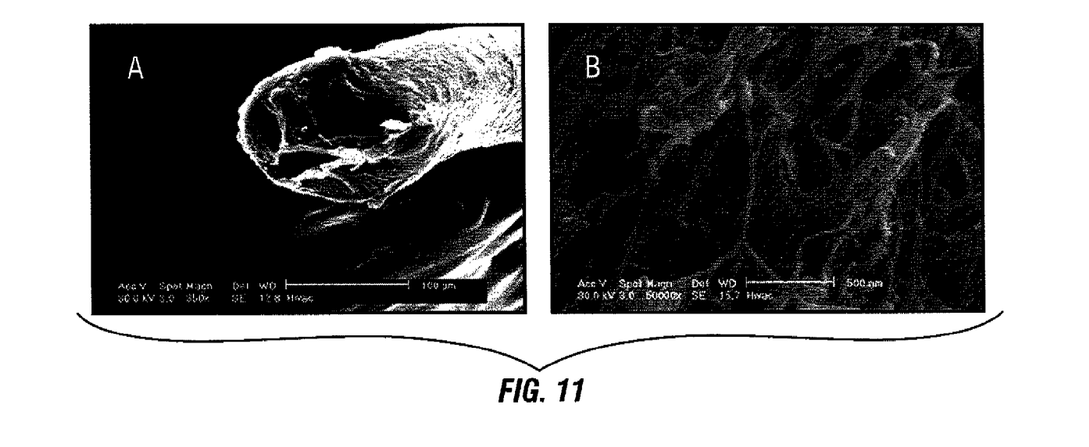
FIGS. 11(A) and 11(B) depict the fracture surface of a BP-f-SWNT continuous fiber (A), and a higher magnification image of ropes of nanotubes coated with polymer after fracture in a BP-f-SWNT fiber (B)

Interfacial covalent linkage of the incorporated nanotubes to the surrounding polymer matrix via the BP-f-SWNTs is further supported by SEM imaging of the fiber fracture surfaces, as shown in FIGS. 11(A) and 11(B). The ropes of nanotubes remain coated with polymer even after facture, suggesting that the interface between the materials has, in fact, been formed and remains even after tensile loading. This is in contrast to the expected pullout of the nanotubes, or ropes of nanotubes, from the polymer matrix had there been no interfacial adhesion between the two components. Furthermore, the image in FIG. 11(B) shows broken ends of preferentially aligned nanotubes still coated with polymer—which is expected if effective load transfer to the stronger reinforcing nanotubes has been accomplished via Schemes 1a and 1b (FIG. 3), thereby contributing to the higher mechanical properties observed.

Conclusions

The formation of benzoyl peroxide initiated functionalization of single walled carbon nanotube (BP-f-SWNT) com-

TABLE 4

Improvement of mechanical properties of varying weight percentages of BP-f-SWNT NCFs and P-SWNTs NCFs over neat polypropylene fiber.

| Sample (4r) | Average Diameter (μm) | Extension at Failure (mm) | Maximum Stress (MPA) | Increase Maximum Stress (%) | Tensile Modulus (MPa) | Increase Tensile Modulus (%) |
|---|---|---|---|---|---|---|
| Neat Polypropylene | 130 | 398 ± 19.9 | 30.65 ± 1.86 | — | 453.26 ± 14 | — |
| 2.5 wt. % BP-f-SWNT | 130 | 250 ± 32 | 56.06 ± 5.54 | 82.9 | 766.7 ± 19.1 | 69.2 |
| 5 wt. % BP-f-SWNT | 130 | 275 ± 38 | 58.18 ± 13.2 | 89.8 | 905.5 ± 20 | 99.7 |
| 7.5 wt. % BP-f-SWNT | 130 | 187 ± 24 | 52.8 ± 7.38 | 72.3 | 1075 ± 25.2 | 137.2 |
| 10 wt. % BP-f-SWNT | 130 | 147 ± 86 | 83.7 ± 49 | 173.1 | 1059.3 ± 23 | 133.7 |
| 2.5 wt. % PSWNT | 130 | 133.13 ± 27 | 28.9 ± 5.39 | NSI | 440 ± 8.7 | NSI |
| 5 wt. % PSWNT | 130 | 197.56 ± 21 | 35.1 ± 4.83 | NSI | 349.5 ± 6.4 | NSI |
| 7.5 wt. % PSWNT | 130 | 153.2 ± 15 | 18.9 ± 4.337 | NSI | 255 ± 5.4 | NSI |
| 10 wt. % PSWNT | 130 | 151.5 ± 24 | 32.6 ± 8.54 | NSI | 366.5 ± 7.8 | NSI |

*NSI—no significant improvement in mechanical properties posite fibers is representative of creating a more seamless material. The components of the composite transition from a two-phase material toward a material more singular in phase and which behaves as a fully integrated system. In a sense, the ideal CNT/polymer composite made via methods of the present invention can be thought of as a material composed of macromolecules instead of the conventional matrix and reinforcing filler composite. In the study described above, Applicants demonstrate that fibers made from BP-f-SWNT in polypropylene are materials demonstrating such characteristics. Applicants have created a composite material in which the reinforcing filler (SWNTs) is covalently linked to the surrounding polymer resulting in a strong interface between the two phases, which is in turn exploited when the material is subjected to tensile loading, thereby yielding increased mechanical properties. Accordingly, Applicants are able to create a stronger material which can be used for other applications where strong, lightweight polymers are required.

Figure 12:
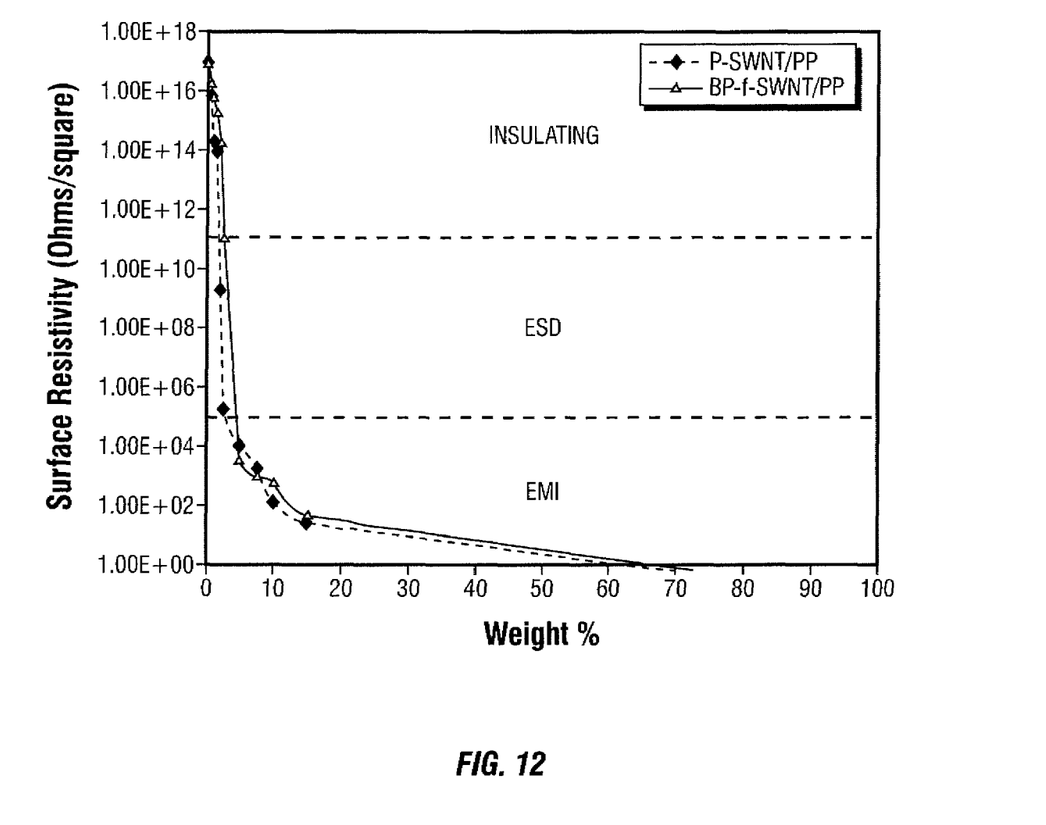
FIG. 12 graphically depicts the surface resistivity of BP-f-SWNT/PP and P-SWNT/PP for various wt. % SWNTs.
Figure 13:
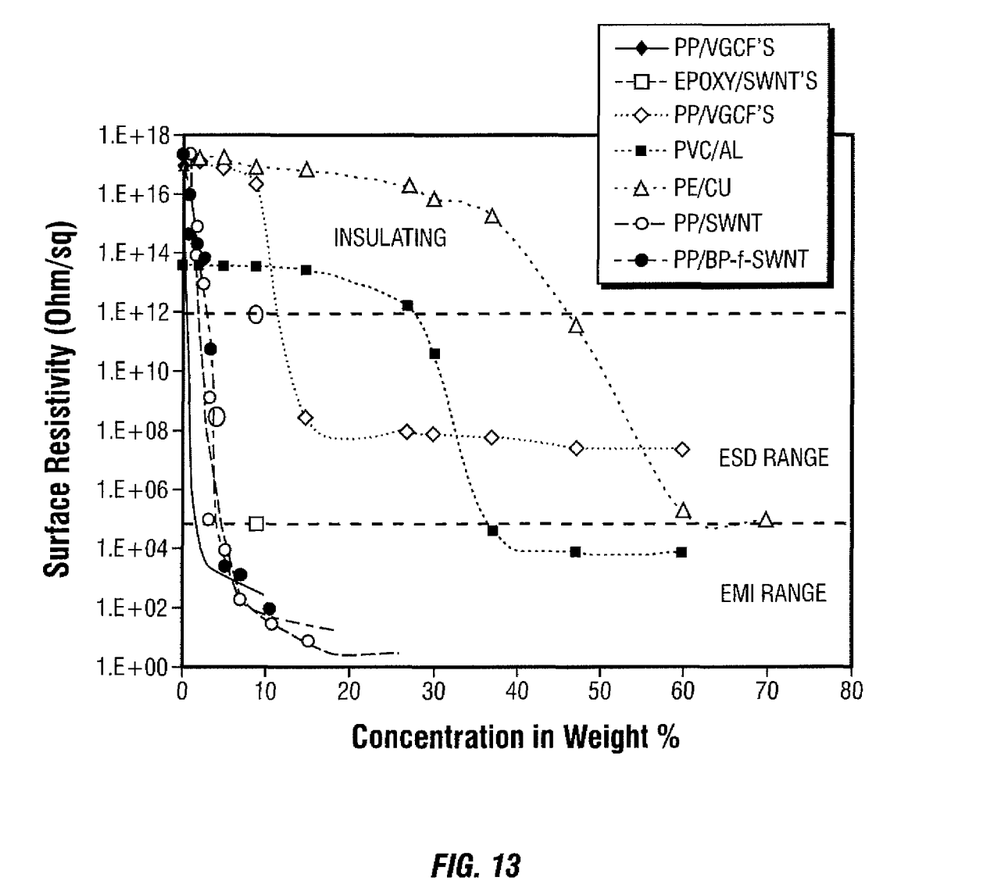
FIG. 13 graphically compares the surface resistivity of BP-f-SWNTs at various loadings to other composite systems.

While the fully integrated CNT/polymer composites generally possess mechanical improvements (e.g., over the same polymer without the CNTs), such composites can also benefit from the electrical properties of the CNTs. For example, the BP-f-SWNTs can add to the conducting nature of the polymer system as well. The data shown in Table 5, and depicted graphically in FIG. 12, compares the surface resistivity of BP-f-SWNT/PP and P-SWNT/PP for various wt. % SWNTs. This data is significant in that it demonstrates that there are ways to functionalize nanotubes for composite use, where the nanocomposite maintains its conductivity. Note that the addition of functionalized SWNTs does not lead to loss of electrical conductivity. Note also that that the conductivity shown for the polypropylene system is not very different that that for the ABS system. While not intending to be bound by theory, it is expected that the functionalization is applied to the outer nanotubes in a rope and that the inner nanotubes in the bundle still provide for electrical conduction. FIG. 13 compares the surface resistivity of BP-f-SWNTs at various loadings to other composite systems.

TABLE 5

Surface resistivities of BP-f-SWNT/PP and P-SWNT/PP for various wt. % SWNTs.
Surface Resistivity (ohm/sq.)

| Wt % | P-SWNT/PP | BP-f-SWNT/PP |
|---|---|---|
| 0.0 | 1.00E+17 | 1.00E+17 |
| 0.5 | >2E14 | >2E14 |
| 1.0 | >2E14 | >2E14 |
| 1.5 | 9.23E+13 | >2E14 |
| 2.0 | 2.01E+09 | >2E14 |
| 2.5 | 1.90E+05 | 1.32E+11 |
| 5.0 | 1.09E+04 | 3.68E+03 |
| 7.5 | 1.81E+03 | 1.07E+03 |
| 10.0 | 1.36E+02 | 6.47E+02 |
| 15.0 | 2.72E+01 | — |

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
a) dispersing CNTs, a thermoplastic polymer, and a free radical precursor species in a solvent;
b) removing the solvent to form polymer-overcoated CNTs comprising the free radical precursor species; and
c) compounding the polymer-overcoated CNTs comprising the free radical precursor species;
   wherein the compounding step comprises forming a fully-integrated CNT/polymer composite;
   wherein the fully-integrated CNT/polymer composite has interfacial covalent bonding between the CNTs and the polymer; and
   wherein the interfacial covalent bonding comprises at least one carbon-carbon covalent bond between the CNTs and the thermoplastic polymer.

2. The method of claim 1, further comprising a step of processing the fully-integrated CNT/polymer composite in an extruder by shear forces.

3. The method of claim 2, wherein the CNTs become substantially aligned during the processing step.

4. The method of claim 1, wherein the CNTs are selected from the group consisting of single-wall carbon nanotubes, multi-wall carbon nanotubes, double-wall carbon nanotubes, and combinations thereof.

5. The method of claim 1, wherein the dispersing step comprises use of a surfactant.

6. The method of claim 1, wherein the solvent is selected from the group consisting of CHCl$_3$, THF, toluene, o-dichlorobenzene, and combinations thereof.

7. The method of claim 1, wherein the CNTs comprise single-wall carbon nanotubes.

8. The method of claim 1, wherein the thermoplastic polymer comprises polypropylene.

9. The method of claim 1, wherein the free radical precursor species is a peroxide.

10. The method of claim 1, wherein the free radical precursor species is benzoyl peroxide.

11. The method of claim 1, wherein the free radical precursor species decomposes to a free radical species during the compounding step; and
   wherein the free radical species initiates formation of the interfacial covalent bonding between the CNTs and the thermoplastic polymer.

12. A method comprising the steps of:
a) dispersing SWNTs, a thermoplastic polymer, and an organic peroxide species in a solvent;
b) removing the solvent to form polymer-overcoated SWNTs comprising the organic peroxide species;
c) compounding the polymer-overcoated SWNTs comprising the organic peroxide species;
   wherein the compounding step comprises forming a fully-integrated SWNT/polymer composite;
   wherein the fully-integrated SWNT/polymer composite has interfacial covalent bonding between the SWNTs and the polymer; and
   wherein the interfacial covalent bonding comprises at least one carbon-carbon covalent bond between the SWNTs and the thermoplastic polymer; and
d) processing the fully-integrated SWNT/polymer composite in an extruder by shear forces.

13. The method of claim 12, wherein the SWNTs become substantially aligned in the processing step.

14. The method of claim 12, wherein the dispersing step comprises use of a surfactant.

15. The method of claim 12, wherein the solvent is selected from the group consisting of $CHCl_3$, THF, toluene, o-dichlorobenzene, and combinations thereof.

16. The method of claim 12, wherein the organic peroxide species is benzoyl peroxide.

17. The method of claim 12, wherein the thermoplastic polymer comprises polypropylene.

18. The method of claim 12, wherein the organic peroxide species decomposes to a free radical species during the compounding step; and wherein the free radical species initiates formation of the interfacial covalent bonding between the SWNTs and the thermoplastic polymer.

19. An article comprising the fully-integrated CNT/polymer composite prepared by the method of claim 3.

20. The article of claim 19, wherein the CNTs comprise SWNTs.

* * * * *